INVENTOR.
Wolfgang Melinat
BY Donald P. Schwerki
His Attorney

March 14, 1967 W. MELINAT 3,308,620
PRESSURE REDUCER FOR DUAL MASTER CYLINDER
Filed April 15, 1965 2 Sheets-Sheet 2

INVENTOR.
Wolfgang Melinat
BY Donald P. Selvecki
His Attorney

United States Patent Office 3,308,620
Patented Mar. 14, 1967

3,308,620
PRESSURE REDUCER FOR DUAL MASTER CYLINDER
Wolfgang Melinat, Dayton, Ohio, assignor to General Motors Corporation, Detroit, Mich., a corporation of Delaware
Filed Apr. 15, 1965, Ser. No. 448,346
6 Claims. (Cl. 60—54.5)

This invention relates to vehicle braking mechanism and more directly to mechanism adapted for use with a master cylinder to proportion pressures distributed to various wheel brakes.

In the use of conventional brakes for a vehicle, a problem exists in the distribution of braking force in a proportion equal to the weight on wheels which are to be stopped. For exmaple, on automobiles having a front mounted engine, a weight redistribution takes place during braking which effectively places much more weight on the front wheels of the vehicle than on the rear wheels. Consequently, more force is required to rotationally impede the front wheels than the rear wheels. If the force applied to all of the wheels is equal, a point can be reached where the rear wheel brakes lock while the front wheel brakes have not completely stopped rotation of those wheels. This can result in skidding of the rear wheels, thereby effectively increasing the minimum stopping distance.

It is an object of the present invention to provide an improved braking mechanism which allows a disproportionate force application to front and rear wheel brakes of a vehicle.

It is another object of the present invention to provide improved brake mechanism which involves the combining of a dual hydraulic master cylinder with a pressure reducer in the outlet line to wheels which are more likely to skid.

It is still another object of the present invention to provide an improved mechanism of the type previously described which has the pressure reducer integrally formed with the master cylinder.

It is a further object of the present invention to provide an improved pressure reducer for use in a vehicle braking system which utilizes differential areas acting on a piston to bring about a difference in pressure output than available at the inlet of the device.

It is yet a further object of the present invention to provide an improved pressure reducing device for use in a vehicle braking system which is not responsive until pressures are developed which would be likely to cause locking of some of the brakes serviced by a device while not locking certain other brakes serviced by the device.

Further objects and advantages of the present invention will be apparent from the following description, reference being had to the accompanying drawings wherein a preferred embodiment of the present invention is clearly shown.

Figure 1:
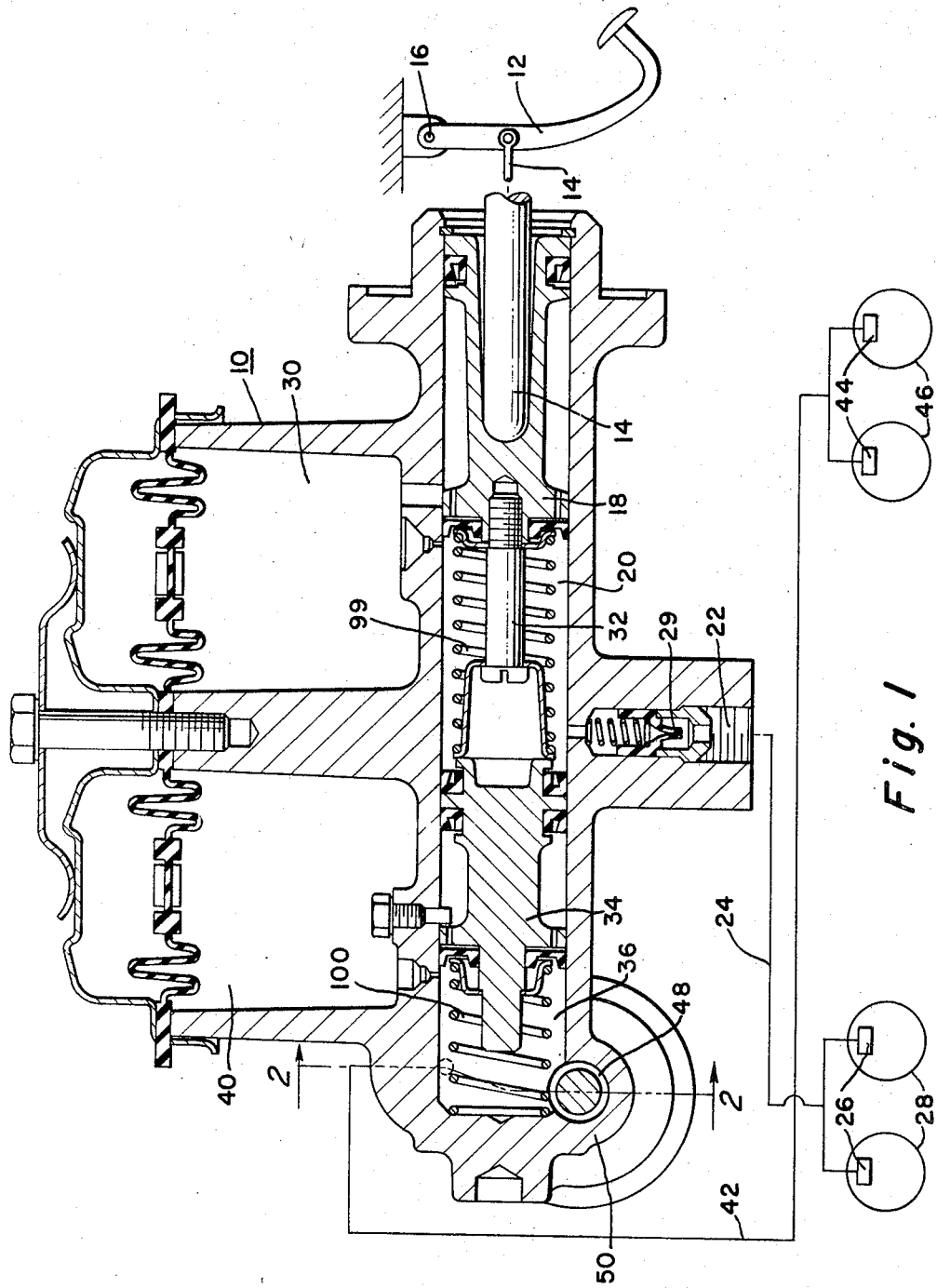
FIGURE 1 is a sectional view of the typical dual hydraulic master cylinder with the invention integrally formed therewith, a typical braking system being diagrammatically shown.

Referring to FIGURE 1, a dual master cylinder, generally designated by the numeral 10, is illustrated as being actuatable by a brake pedal 12 through a push rod 14. The brake pedal 12 is pivotally supported at point 16 carried by a fixed portion of the vehicle. The push rod 14 is adapted to move a piston 18 into a chamber 20 resulting in a displacement of fluid contained therein to an outlet 22. In the example given, it is assumed that the outlet 22 communicates through a brake line 24 with front wheel cylinders 26 which are adapted to engage vehicle front wheel brakes 28. A check valve 29 in the outlet 22 is spring loaded and arranged to provide a certain predetermined residual pressure in line 24. Fluid is drawn from reservoir 30 into compartment 20 in a conventional manner.

A drive rod 32 carried by piston 18 and drivably engaging piston 34 is adapted to cause a simultaneous displacement of fluid in chamber 36 into an outlet 48. A reservoir 40, separate from reservoir 30, is arranged to supply fluid for chamber 36 in a conventional manner. Outlet 48 of the master cylinder 10 communicates in a manner to be hereinafter described through brake line 42 to wheel cylinders 44 adapted to actuate rear wheel brakes 46. It is understood that the designation "front wheel brakes and rear wheel brakes" is used by way of example alone and does not restrict the use of the subject invention in any manner. For purposes of this example, therefore, it is being assumed that the brakes 28 and 46 are carried by the front and rear wheels respectively of a vehicle on which an effective weight shift during braking occurs in a forward direction.

Figure 2:
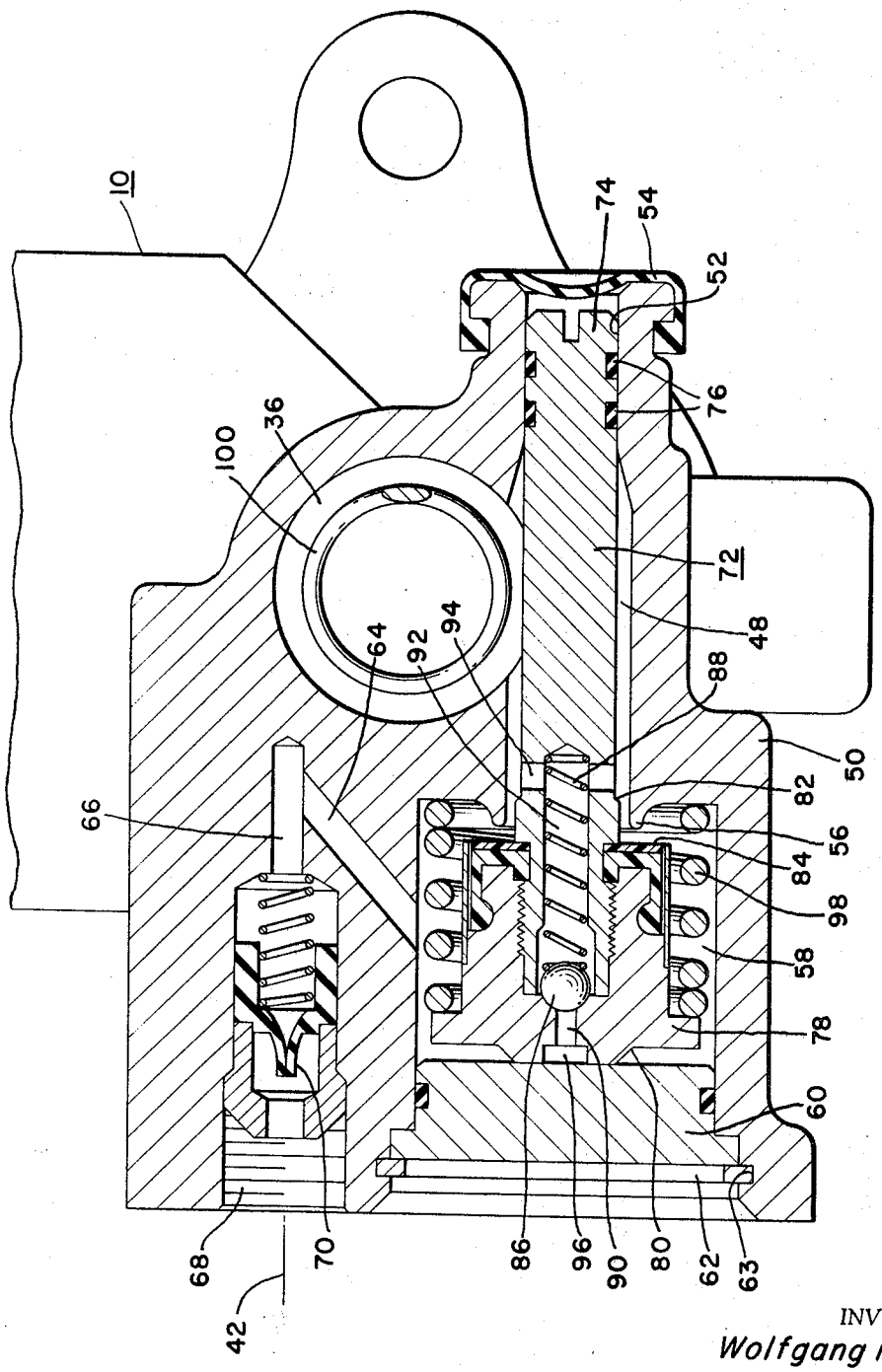
FIGURE 2 is an enlarged sectional view taken along line 2—2 of FIGURE 1.

Referring to FIGURE 2, chamber 48 is sometimes referred to herein as an inlet to a control body 50. Control body 50 is integrally formed with a master cylinder 10 in the preferred embodiment. Chamber 48 terminates at one end in a bore 52 which is effectively an opening to the atmosphere from control body 50 and enclosed by a protective boot 54. An opposite end of chamber 48 terminates in a seat 56 which is the juncture of chamber 48 and a larger chamber 58. Chamber 58 is enclosed by a plug 60 held in place by a resilient split ring 62 carried in groove 63.

A drilled passage 64 intersects a drilled passage 66 which provides a path for fluid communication between chamber 58 and an outlet 68. A check valve 70 is disposed in the control body 50 between the outlet 68 and the drilled passage 66. Check valve 70 is similar to check valve 29 and performs the same function by retaining a pressure in line 42.

A piston means, generally designated by numeral 72, has a first portion 74 slidable in bore 52 and carries sealing rings 76 in contact therewith to prevent the passage of fluid from chamber 48 to the atmosphere. Piston means 72 has an enlarged portion 78 sometimes referred to herein as the third portion. A rear face 80 of third portion 78 presents a differential area in chamber 58 to be acted upon by fluid pressure therein in a manner to be hereinafter described. Piston means 72 also has a smaller face 82 which presents an area to be acted upon by pressure in chamber 48. The smaller face 82 is sometimes referred to herein as the second portion.

A resilient sealing means 84 is carried by the third portion 78 in any well-known manner and is adapted to engage seat 56 in a manner isolating pressure in chamber 48 from chamber 58. A selective bypass between chamber 58 and chamber 48 is supplied by a ball 86 loaded by a spring 88 closing off passage 90. Passage 90 communicates with chamber 48 through passage 92 and passage 94. Therefore, it is seen that there is normally free fluid communication between chambers 48 and 58 with the sealing means 84 removed from seat 56. When sealing means 84 engages seat 56, communication is provided between area 96, which becomes a portion of chamber 58, and chamber 48 through passages 96 and 90 past ball check valve 86 through passages 92 and 94. A spring 98 is provided which biases the piston means 72 into engagement with plug 60 and normally maintains sealing means 84 off the seat 56.

In operation and referring to FIGURE 1, a cycle of operation is initiated by the brake pedal 12 being pivoted about point 16. This results in push rod 14 moving piston 18 and piston 34 simultaneously into chambers 20 and 36, respectively. This causes a pressure build-up at outlet 22 and outlet 48. Pressure is immediately communicated past sealing means 84 into chamber 58. Pressure is likewise felt at outlet 68 through passages 64 and 66. Initially the pressure build-up is experienced equally in wheel cylinders 26 and wheel cylinders 44. There being no restriction between outlet 22 and wheel cylinders 26, all of the pressure build-up in chamber 20 acts on wheel cylinders 26 through line 24. The pressure build-up in chamber 36 is likewise communicated through wheel cylinders 44, but only up to a certain point, this point being determined by design considerations.

Referring to FIGURE 2, pressure build-up in chamber 36 is freely communicated to chamber 48. This pressure also is freely communicated to chamber 58 and, hence, to the outlet 68 through passages 64 and 66. Outlet 68 communicates with wheel cylinders 44 through line 42 and, therefore, free pressure communication is had from chamber 36 of the master cylinder 10. However, as pressure builds up in the system, the pressure in chamber 48 against face 82 of piston means 72 and against seal 84 combined with the force against piston means 72 by spring 98 is no longer sufficient to overcome the force in chamber 58 against face 80 of piston means 72. When this point is reached, piston means 72 is moved to the right, as viewed in FIGURE 2, and sealing means 84 seats at 56 and the first portion 74 slides in bore 52 in the direction of boot 54. At this time, the pressure in chamber 48 is isolated from chamber 58 because sealing means 84 is on seat 56 and pressure on either side of ball 86 is equal. Spring 88 is the dominant force acting on ball 86 and keeps passage 90 blocked.

As more force is exerted on push rod 18, a pressure increase is experienced in chamber 20 and chamber 36, as seen in FIGURE 1. Pressure build-up continues in wheels 26 through line 24, there being free pressure communication between outlet 22 and wheel cylinders 26. Referring to FIGURE 2, pressure builds up in chamber 36 and in chamber 48 but is not communicated to chamber 58 which is now sealed. When sufficient force is generated in chamber 48 to act against surface 82 and against seal 84, piston means 72 will again shift to the left, as viewed in this figure. However, some force is expended and, therefore, at any given moment just prior to sealing means 84 being driven from seat 56, a pressure differential exists between chamber 48 which is the outlet of chamber 36 and outlet 68. Therefore, wheel cylinders 44, being communicated pressure through line 42, will have less pressure exerted thereon than on wheel cylinders 26. It is understood that, under the previously described conditions of operation, the predominant position of piston means 72 will be away from plug 60. It is obvious that intermittent unseating of sealing means 84 will occur but will immediately be neutralized due to the differential area between face 80 and face 82.

When pressure is relieved from brake pedal 12, as seen in FIGURE 1, spring 99 and spring 100 acting on pistons 18 and 34, respectively, will move pistons 18 and 34 to a position of rest. Therefore, pressure will be relieved in chamber 20 and chamber 36. Pressure in wheel cylinders 26 will diminish to a point dictated by the strength of check valve 29. Pressure in wheel cylinders 44, however, would be trapped except for ball 86.

Referring to FIGURE 2, with the relief of pressure in chamber 36, pressure also falls in chamber 48. The pressure in chamber 58, however, is momentarily held and acts against ball 86. Ball 86 is moved to the right, as viewed in FIGURE 2, against the compressive force of spring 88. Pressure exceeding the force needed to overcome spring 88 and the pressure in chamber 92 is thereafter communicated through passages 96, 90, 92 and 94 to chamber 48. Spring 98 becomes the dominant force acting on piston means 72 resulting in a leftward movement of piston means 72 to the position shown in FIGURE 2. The system is then returned to a static position wherein the referenced components are poised awaiting another brake actuation.

Utility of the subject invention is readily apparent in an operative environment of a vehicle braking system. A differential pressure is desirable in such a system, as previously stated, due to the effective weight shift taking place during a braking actuation. It has also been made clear that the reference to front and rear wheels in the specification is illustrative alone and is significant only when a weight shift is to be effected in the direction described. It is likewise apparent that the invention as herein described need not be used in the environment of a vehicle braking system but is adaptable for use in any environment where a differential pressure is required in two pressure operative devices when pressure therefor originates in a common source.

Another noteworthy feature of the subject invention is the capability of the control device described to provide equal brake pressure to various hydraulically operated components during the initial stages of pressurization thereof and to later provide a differential pressure therebetween. In the environment of a vehicle braking system, this is particularly important in view of the fact that casual braking of the vehicle is accomplished with equal pressure exerted on all of the vehicle brakes. However, when pressure exerted exceeds certain predetermined limits, as in panic stops, the differential pressure is provided when wheel skid is likely to occur.

The integral construction of the control mechanism and the dual master cylinder is also noteworthy in that the advantages of compactness, reduced cost, and bleedability are introduced into the already very efficient combination. The pressure reducer or control necessarily results in an equalization of brake wear between wheels of a vehicle and more importantly adds the safety feature of resisting wheel skids due to effective weight shifts during braking actions.

While the embodiment of the present invention, as herein disclosed, constitutes a preferred form, it is to be understood that other forms might be adopted.

What is claimed is as follows:

1. A pressure control comprising: a control body; an inlet to said control body from a pressure source; an outlet from said control body to a pressure operable device; said control body having a first chamber communicating with said inlet and a second chamber of larger diameter communicating with said outlet; piston means having a first portion slidably carried in said first chamber and having a second portion reciprocable in response to pressure in said second chamber, said piston means including differential areas and valving means carried in juxtaposition to the juncture of said first and second chambers; and spring means carried by said piston means and disposed to urge said piston means away from a portion of said control body in a manner keeping said sealing means out of engagement with the juncture of said first and second chambers, a first differential area of said piston means responsive to inlet pressure and a second differential area of said piston means responsive to outlet pressure to selectively position said sealing means relative to said control body thereby maintaining a constant pressure differential at said outlet and inlet when pressure rises in said second chamber sufficient to compress said spring means.

2. A pressure control according to claim 1 wherein said piston means includes a portion constantly at atmospheric pressure.

3. A pressure control according to claim 1 wherein said piston means has a chamber communicating pressure from said first chamber to said second chamber with a check valve in said chamber arranged to equalize pressures therebetween under operating conditions where pressure in said inlet is insufficient to compress said spring means.

4. In combination, a hydraulic master cylinder and pressure control apparatus, said hydraulic master cylinder having at least two pressure outlets therefrom, one of said pressure outlets being in fluid communication with said pressure control apparatus, said pressure control apparatus comprising: a control body integrally formed with said hydraulic master cylinder, said control body having an inlet at substantially the same pressure at least as one of the outlets from said master cylinder and an outlet to a pressure operable device; piston means slidable in said control body and including portions adapted to isolate pressure in said master cylinder from an outlet of said control body, said piston means having a first portion responsive to atmospheric pressure, a second portion responsive to pressure from the outlet of the hydraulic master cylinder and a third portion responsive to pressure at the outlet of the control body, said piston means including a peripherally carried sealing means adapted to be driven into engagement with a portion of the control body thereby allowing a pressure differential to be established between said second and third portions of said piston means; means formed within said piston for allowing said piston means to return to a poised position when the pressure acting on said piston means is reversed; and a spring carried by said piston means and arranged to contact said valve body in a manner urging the sealing means of the piston means from its engagement with said control body, said third portion of said piston means having an area larger than the second portion of said piston means and thereby being responsive to a pressure build-up in said hydraulic master cylinder of a magnitude sufficient to overcome the combined force of the pressure acting on said second portion of said piston means and the spring means to isolate the inlet of said control body from the outlet of said control body thereby maintaining a pressure differential therebetween.

5. The combination according to claim 4 wherein said piston means has portions separately acted upon by atmospheric pressure, an inlet pressure from said hydraulic master cylinder, a compressive force of said spring adding to the force of atmosphere and the inlet force from said hydraulic master cylinder to bias said piston means in one direction, and a force at the outlet of said control body sufficient at certain operating pressures to overcome the first mentioned forces to bias the piston means in an opposite direction bringing said piston means into a pressure shut-off relationship with respect to the inlet from said master cylinder.

6. The combination according to claim 5 wherein said piston means includes an integrally formed ball check valve adapted to equalize pressure in said control body and said hydraulic master cylinder in response to a pressure build-up in the outlet of said control body in excess of the pressure at the outlet of said hydraulic master cylinder.

References Cited by the Examiner

UNITED STATES PATENTS

| | | | |
|---|---|---|---|
| 3,088,285 | 5/1963 | Giacosa et al. | 60—54.6 |
| 3,209,542 | 10/1965 | Francia | 60—54.6 X |
| 3,217,494 | 11/1965 | Stelzer | 60—54.5 |
| 3,245,221 | 4/1966 | James et al. | 60—54.5 |
| 3,251,186 | 5/1966 | De Coye De Castelet | 60—54.5 |

MARTIN P. SCHWADRON, *Primary Examiner.*

ROBERT R. BUNEVICH, *Examiner.*